United States Patent Office 3,424,638
Patented Jan. 28, 1969

---

3,424,638
CHEMICAL PROCESS
Nelson S. Marans, Silver Spring, Md., assignor to W. R. Grace & Co., New York, N.Y., a corporation of Connecticut
No Drawing. Filed Nov. 2, 1964, Ser. No. 408,342
U.S. Cl. 156—272                   6 Claims
Int. Cl. C09j 3/14; B01j 1/10

The present invention relates to the bonding of materials and more specifically to improved method for laminating a wide variety of similar and dissimilar materials.

Many adhesive compositions have been disclosed in the prior art. Adhesive systems have been developed for practically all types of materials and range from simple one component composition to complicated multi-component mixtures. These systems include the use of irradiation polymerizable monomeric materials which are placed between layers of material to be bonded and polymerized by irradition.

Prior art irradiation adhesive systems possess the inherent drawback in that extended doses of irradiation are required to achieve the required degree of polymerization and bond strength. To date, an adhesive system which may be applied to a wide variety of materials and which rapidly develops a high degree of bond strength with low doses of radiation has not been developed.

It is therefore an object of the present invention to provide a radiation activated adhesive laminating system which provides bonds having a great degree of strength with a minimum of irradiation.

It is another object to provide a method of practically instantaneously binding a wide variety of materials which are similar and dissimilar in chemical composition using a relatively inexpensive and simple bonding agent and technique.

These and still further objects of the present invention will become readily apparent to one skilled in the art from the following detailed description and specific examples.

Broadly, the present invention contemplates a bonding method which comprises placing a relatively thin layer of acrylic acid between two or more layers to be bonded, and subsequently polymerizing the monomer by subjecting it to high energy ionizing radiation.

More specifically, we have found that two layers of similar or dissimilar materials may be rapidly and securely bonded by placing a liquid layer of acrylic acid between the layers and irradiating the composite structure with sufficient high energy ionizing irradiation to polymerize the monomer. It is found that by using this technique strong adhesive bonds may be formed between a wide variety of materials almost instantaneously. The bond achieves full strength upon polymerization by irradiation and requires no further curing or setting period to acquire additional permanency.

As indicated above, acrylic acid which is used as the adhesive agent herein is irradiation polymerized in a minimum amount of time. As a matter of fact, I have found that in my process acrylic acid polymerizes almost explosively in a radiation field to prepare the laminated structures contemplated herein. It is also contemplated that minor amounts of $CH_2=C<$ containing monomers such as ethyl acrylate, 2-ethylhexyl acrylate, and a number of other alkyl acrylates and methacrylates may be combined with acrylic acid to enhance or modify the bonding characteristics thereof. Modifying amounts of these monomers ranging from about 1 to 80% by weight of the acrylic acid used may be combined with the acrylic acid.

Substrates which may be bonded by the technique contemplated herein included a wide variety of materials which are chemically similar or dissimilar. For example, the present technique may be used on organic polymer materials such as polyethylene, polypropylene, polyamides, polyesters, polytetrafluoroethylene, polyvinyl chloride, polyvinylidene chloride, polystyrene, nylon, and polymethyl methacrylate. These synthetic organic materials may be bonded to each other or they may be bonded to metallic materials such as aluminum, tin, lead, gold and silver, steel, stainless steel, iron, and so forth. Furthermore, the films may be advantageously bonded to cellulosic materials such as paper and wood using the present technique.

The bonding operation is carried out by simply applying a relatively thin layer (on the order of 5 to about 100 microns thickness of polymerizable monomer between the layers of materials to be bonded). The composite structure is then subjected to high energy ionizing irradiation such as high energy electrons having energy of from about 10 kev. to about 10 mev. The beam energy must be sufficient to penetrate to the acrylic acid layer and through this layer. The irradiation is conducted advantageously at room temperature, however, temperatures ranging from about 0 to about 100° C. may be similarly employed.

The composite structure is subjected to from about 0.1 to about 5.0 megarads of ionizing irradiation. It is found that a minimum dosage rate of $3 \times 10^3$ rads per second is required to give the desired bonding effect. Therefore, the irradiation is preferably delivered in a single dose or in as few doses as possible. The optimum condition is to polymerize as much of the acrylic acid as possible in a single pass. This method gives an exotherm which results in the best bonding. Temperatures of over 200° C. have been achieved in the acrylic acid layer immediately after irradiation. This exotherm appears to contribute to the superior bonding in the system. The acrylic acid used herein as the bonding agent polymerizes with almost explosive rapidity, and hence, an instantaneous bond is formed.

We consider that a minimum number of free radicals over a very short period of time is required to give this highly exothermic polymerization and bonding. Radical concentrations of $1 \times 10^{16}$ to $1 \times 10^{19}$ radicals per gram achieved in times of 1 to 120 seconds appear desirable.

Having described the basic aspects of the present invention, the following examples are given to illustrate specific embodiments thereof.

Example I

Numerous samples tabulated in the table below were bonded together using acrylic acid as the bonding monomer. The technique used was to cut 3 x 3 inch squares of the various materials and place 9 drops of acrylic acid on the lower square. The second layer of material is then placed on the lower film to form a continuous liquid layer of acrylic acid between the 2 films. The composite samples were then placed on a styrofoam insert on aluminum tray 10 inches from the accelerator window and given a dose of 2 megarads of irradiation in two passes with a Van de Graaff electron accelerator which produced 2.0 mev. electrons and 195 microampere beam current. A pass rate of 0.32 inch per second and a pass time of 3 minutes were used. The dose per pass therefore was calculated at 1.0 megarad. The film materials used in the examples below are described as follows (each number refers to the example tabulated below):

TABLE I

Examples:  Description of material and thickness
1 ---- Grex—0.96 density polyethylene—1 mil thick.
2 ---- Polypropylene—film grade—1 mil thick.
3 ---- Low density polyethylene film—1 mil thick.
4 ---- Type L film—irradiated low—density polyethylene film—1 mil thick.
5 ---- Type D film—irradiated mixture of low and high density polyethylenes—1 mil thick.
6 ---- Mylar—polyester film—polyethylene terephthalate—8 mils.
7 ---- Teflon film — polytetrafluoroethylene — 2 mils.
8 ---- Polyvinyl chloride—plasticized but unstabilized—5 mils.
9 ---- Saran—polyvinylidene chloride—1 mil.
10 --- Aluminum foil—1 mil—Reynolds wrap.
11 --- Polystyrene—biaxially oriented—1 mil.
12 --- Nylon—6,6—nylon—75 mils.
13 --- Polymethylmethacrylate—25 mils.

TABLE II

|    | 1 | 2 | 3 | 4 | 5 | 6 | 7 | 8 | 9 | 10 | 11 | 12 | 13 |
|----|---|---|---|---|---|---|---|---|---|----|----|----|----|
| 1  |   | E | E | E | E | E | E | E | E | E  | E  | P  | E  |
| 2  | E |   | E | E | E | G | E | E | E | E  | E  | F  | G-E |
| 3  | E | E |   | E | E | F-G | E | E | E | E | E  | P  | E  |
| 4  | E | E | E |   | E | G | E | F-G | E | G-E | E | P  | P  |
| 5  | E | E | E | E |   | P | F | F-G | E | E | E  | P  | F-G |
| 6  | E | G | F-G | G | P |   | G | P | E | P-F | E | P  | P  |
| 7  | E | E | E | E | F | G |   | F-G | G | F-G | E | G  | G  |
| 8  | E | E | E | F-G | F-G | P | F-G |   | E | E | E  | G  | G-E |
| 9  | E | E | E | E | E | E | G | E |   | E | E  | E  | E  |
| 10 | E | E | E | G-E | E | P-F | F-G | P | E |   | E  | P  | P  |
| 11 | E | E | E | E | E | E | E | E | E | E |    | F-G | G-E |
| 12 | P | F | F | P | P | P | G | E | E | E | F-G |    | G-E |
| 13 | E | G-E | E | P | F-G | P | G | G-E | E | P | E  | G-E |    |

NOTE.—E=Excellent bonding with one of polymer films failing; G=Good, one of polymer films failed and traces of delamination; F=Fair, both film failure and delamination; P=Poor, delaminated easily.

TABLE III

| Radiation (MR) | Acrylic acid (percent) | Comonomer | (Percent) | Lamination | Transparency of bond | Nature of bond | Water sensitivity (days)* |
|---|---|---|---|---|---|---|---|
| 3.0 | 90 | N-vinyl-2-pyrrolidone | 10 | Good | Good | Tacky | 7 |
| 3.0 | 80 | do | 20 | do | do | Brittle | 7 |
| 3.0 | 60 | do | 40 | Fair | Opaque | Tacky and brittle | 7 |
| 3.0 | 40 | do | 60 | do | do | Brittle | 7 |
| 3.0 | 20 | do | 80 | do | Poor | do | 7 |
| 3.0 | 90 | Methyl methacrylate | 10 | Excellent | Good | Flexible | 7 |
| 3.0 | 80 | do | 20 | do | do | Slightly | 7 |
| 3.0 | 60 | do | 40 | do | do | Gummy | 7 |
| 3.0 | 40 | do | 60 | Fair | do | Tacky | 7 |
| 3.0 | 20 | do | 80 | Poor | Opaque | do | 7 |
| 3.0 | 90 | Ethyl acrylate | 10 | Excellent | Excellent | Flexible | 30+ |
| 3.0 | 80 | do | 20 | do | do | do | 30+ |
| 3.0 | 60 | do | 40 | do | do | do | 7 |
| 3.0 | 40 | do | 60 | do | do | do | 30+ |
| 3.0 | 20 | do | 80 | do | do | do | 30+ |
| 3.0 | 90 | Ethyl methacrylate | 10 | do | Good | do | 7 |
| 3.0 | 80 | do | 20 | do | do | do | 30+ |
| 3.0 | 60 | do | 40 | do | do | do | 30+ |
| 3.0 | 40 | do | 60 | Good | do | Tacky | 7 |
| 3.0 | 90 | Acrylonitrile | 10 | do | do | Brittle | 7 |
| 3.0 | 80 | do | 20 | do | do | do | 7 |
| 3.0 | 60 | do | 40 | do | do | do | 7 |
| 3.0 | 40 | do | 60 | do | do | do | 30+ |
| 3.0 | 20 | do | 80 | do | do | do | 7 |
| 2.0 | 90 | Methyl methacrylate | 10 | Excellent | Opaque | do | 7 |
| 2.0 | 80 | do | 20 | do | do | do | 30+ |
| 2.0 | 60 | do | 40 | Fair | Good | Tacky | 7 |
| 2.0 | 40 | do | 60 | do | do | do | 7 |
| 2.0 | 20 | do | 80 | Poor | do | do | 7 |
| 2.0 | 90 | Ethyl acrylate | 10 | Excellent | do | Excellent | 30 |
| 2.0 | 80 | do | 20 | do | do | do | 30 |
| 2.0 | 60 | do | 40 | do | do | do | 30+ |
| 2.0 | 40 | do | 60 | do | do | do | 30+ |
| 2.0 | 20 | do | 80 | do | do | do | 30+ |
| 2.0 | 90 | Ethyl methacrylate | 10 | do | do | Tacky | 7 |
| 2.0 | 80 | do | 20 | do | do | do | 7 |
| 2.0 | 60 | do | 40 | Fair | do | Gummy | 30 |
| 2.0 | 40 | do | 20 | Poor | do | Tacky | 7 |
| 2.0 | 20 | do | 80 | do | do | do | 7 |
| 1.0 | 90 | Ethyl acrylate | 10 | Good | do | Tacky | 30 |
| 1.0 | 80 | do | 20 | do | do | do | 30 |
| 1.0 | 60 | do | 40 | Excellent | do | Flexible | 30+ |
| 1.0 | 40 | do | 60 | do | do | do | 30+ |
| 1.0 | 20 | do | 80 | do | do | do | 30+ |
| 0.5 | 90 | do | 10 | Good | do | Tacky | 7 |
| 0.5 | 80 | do | 20 | do | do | do | 7 |
| 0.5 | 60 | do | 40 | do | do | Slightly | 7 |
| 0.5 | 40 | do | 60 | Excellent | do | Flexible | 30+ |
| 0.5 | 20 | do | 80 | Good | do | Gummy | 7 |
| 3.0 | 90 | 2-hydroxyethyl Methacrylate | 10 | Excellent | Opaque | Brittle | 7+ |
| 3.0 | 80 | do | 20 | do | do | do | 7+ |
| 3.0 | 60 | do | 40 | do | do | do | 7+ |
| 3.0 | 40 | do | 60 | do | do | do | 7+ |
| 3.0 | 20 | do | 80 | do | do | do | 7+ |
| 3.0 | 90 | Stearyl methacrylate | 10 | Fair | do | do | 7 |
| 3.0 | 80 | do | 20 | do | do | do | 7 |
| 3.0 | 60 | do | 40 | Excellent | do | do | 7+ |
| 3.0 | 40 | do | 60 | do | do | do | 7+ |
| 3.0 | 20 | do | 80 | do | do | do | 7 |
| 3.0 | 90 | Lauryl methacrylate | 10 | Poor | Fair | Gummy | 7 |
| 3.0 | 80 | do | 20 | do | do | Very gummy | 7 |
| 3.0 | 60 | do | 40 | Excellent | do | Brittle | 7+ |
| 3.0 | 40 | do | 60 | do | do | do | 7+ |
| 3.0 | 20 | do | 80 | do | do | do | 7+ |

TABLE III—Continued

| Radiation (MR) | Acrylic acid (percent) | Comonomer | (Percent) | Lamination | Transparency of bond | Nature of bond | Water sensitivity (days)* |
|---|---|---|---|---|---|---|---|
| 3.0 | 90 | 1,3-butylene dimethacrylate | 10 | Fair | Good | Slightly brittle | 7 |
| 3.0 | 80 | ...do | 20 | ...do | ...do | Brittle | 7 |
| 3.0 | 60 | ...do | 40 | ...do | ...do | ...do | 7 |
| 3.0 | 40 | ...do | 60 | ...do | ...do | ...do | 7 |
| 3.0 | 20 | ...do | 80 | ...do | ...do | ...do | 7 |
| 3.0 | 90 | 2-ethylhexyl methacrylate | 10 | Excellent | ...do | Flexible | 7+ |
| 3.0 | 80 | ...do | 20 | ...do | ...do | ...do | 7+ |
| 3.0 | 60 | ...do | 40 | Fair | ...do | ...do | 7 |
| 3.0 | 40 | ...do | 60 | Excellent | ...do | ...do | 7+ |
| 3.0 | 20 | ...do | 80 | ...do | ...do | ...do | 7+ |
| 3.0 | 90 | Butyl methacrylate | 10 | Fair | ...do | ...do | 7 |
| 3.0 | 80 | ...do | 20 | Fair-good | ...do | ...do | 7 |
| 3.0 | 60 | ...do | 40 | Excellent | ...do | ...do | 7 |
| 3.0 | 40 | ...do | 60 | ...do | ...do | ...do | 7+ |
| 3.0 | 20 | ...do | 80 | ...do | ...do | ...do | 7+ |

*Water sensitivity was tested by placing the sample in water at 25° C. and measuring the time to delamination at 1, 7, 14 and 30 days.

Example II

To illustrate that acrylic acid may be admixed with various ratios of copolymerizable monomers to obtain bonds having various properties the runs tabulated below were conducted. The radiation dosage was varied from 0.5 to 3.0 MR using 2 mev. electrons. All doses were delivered within a 10 second period. Sheet polyethylene was bonded to sheet polypropylene and four drops of acrylic acid comonomer mixture was applied per square inch of bonded area.

The above examples clearly indicate that a wide variety of similar and dissimilar materials may be readily and quickly bonded using the technique described herein.

I claim:

1. A method for bonding which comprises applying a layer of acrylic acid between layers of material to be bonded, and polymerizing said acrylic acid by irradiation with high energy ionizing irradiation whereupon said layers become spontaneously and securely bonded.

2. The method of claim 1 wherein from about 0.1 to about 5 megarads of irradiation is applied.

3. The method of claim 1 wherein said radiation consists of electrons having an energy in excess of that required to penetrate the thinner of the two materials to be bonded and the liquid acrylic acid layer.

4. The method of claim 1 wherein said layers of materials are selected from the group consisting of polyethylene, polypropylene, polyesters, polytetrafluoroethylene, polyvinylchloride, polyvinylidene chloride, aluminum foil, polystyrene, nylon, polymethyl methacrylate, tin plate, and wood.

5. The method of claim 1 wherein from about 20 to about 80% by weight of said acrylic acid is substituted by a member of the group consisting of ethyl acrylate, 2-ethylhexyl acrylate, N-vinyl-2-pyrrolidone, methyl methacrylate, ethyl methacrylate, acrylonitrile, 2-hydroxyethyl methacrylate, stearyl methacrylate, lauryl methacrylate, 1,3-butylene dimethacrylate, 2-ethylhexyl methacrylate, and butyl methacrylate.

6. The method of claim 2 wherein said irradiation is delivered at a rate of at least $3 \times 10^3$ rads per second.

References Cited

UNITED STATES PATENTS 3,157,560    11/1964    Livingston et al. __ 204—159.16

OTHER REFERENCES

Horn: Acrylic Resins, Reinhold, New York, 1960, pp. 8 and 25.

DOUGLAS J. DRUMMOND, *Primary Examiner.*

U.S. Cl. X.R.

161—247; 204—159.16, 159.22